United States Patent Office 3,128,724
Patented Apr. 14, 1964

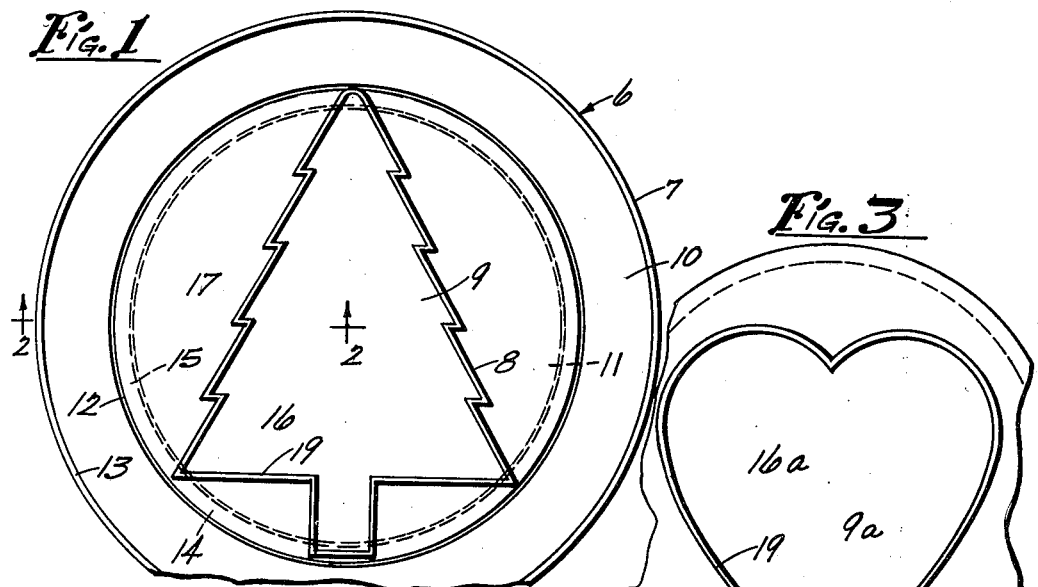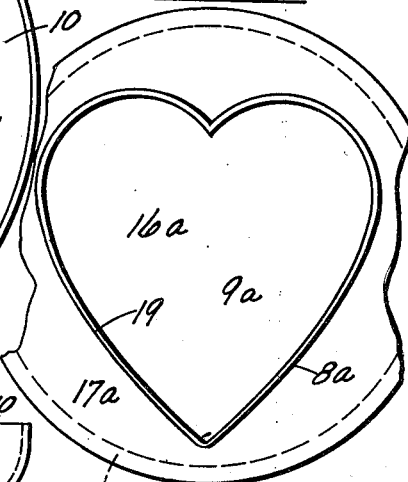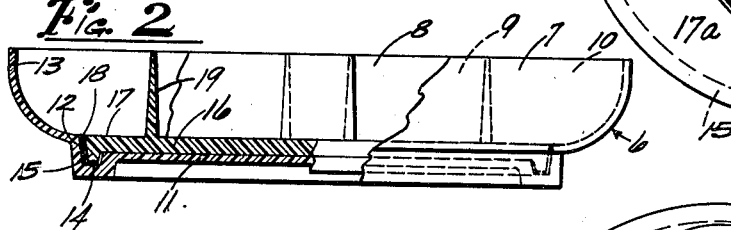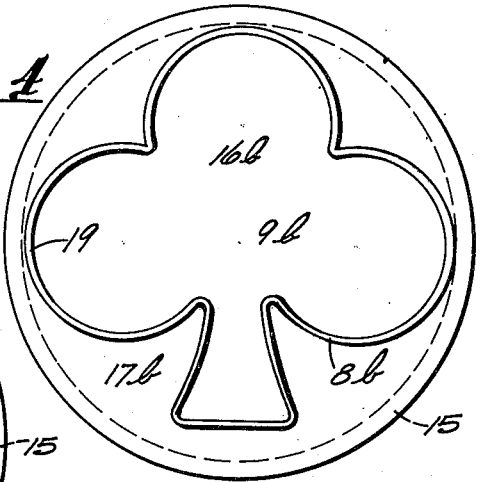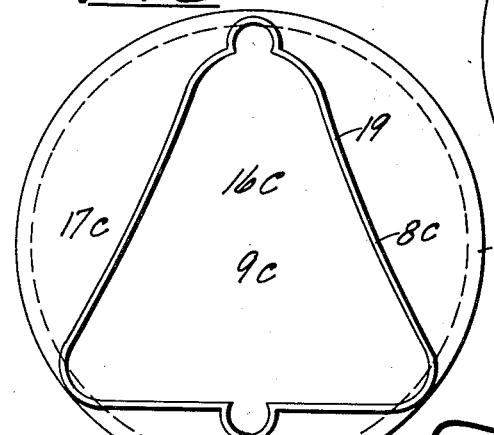
INVENTOR
MARSHALL L. LINDER
ATTY.

3,128,724
GELATIN MOLDS
Marshall L. Linder, Rockford, Ill., assignor to Mo-Mac Manufacturing Co. Inc., Rockford, Ill., a corporation of Illinois
Filed Dec. 7, 1961, Ser. No. 157,758
7 Claims. (Cl. 107—19)

This invention relates to gelatin molds and is more particularly concerned with an improved mold construction whereby different colored gelatins in various designs may be molded simultaneously in a single mold and the finished product after solidification in the refrigerator may be deposited intact on a serving plate despite the presence of an inner mold element inside an outer mold element.

A salient feature of the mold construction of my invention is the provision of an annular groove in the bottom of the outer mold in which an annular rim on the bottom of the inner mold is engaged to center the inner mold properly, the bottom of the inner mold including a marginally projecting wall filling a depression in the bottom of the outer mold, so that in stripping the mold from the molded gelatin, this projecting wall helps to eject the outer portion from the outer mold in the first stage, the outer mold being removed first and then the inner mold. With this construction, there is no limit to the variety of patterns and designs that can be molded using as many different inner molds for as many designs in a single outer mold.

The invention is illustrated in the accompanying drawings in which—

FIGS. 1 and 2 are a plan view and a side view, respectively, of a two-part gelatin mold made in accordance with my invention, the side view having a portion of the outer mold shown in section on the line 2—2 of FIG. 1, and FIGS. 3, 4 and 5 are plan views of other inserts or inner mold elements for use interchangeably in the outer mold shown in FIGS. 1 and 2, in lieu of the other inner mold element shown in those two views.

The same reference numerals are applied to corresponding parts throughout the views.

Referring first to FIGS. 1 and 2, the reference numeral 6 designates the new and improved gelatin mold assembly of my invention consisting of an outer mold 7 and an inner mold 8, this particular assembly being intended for the molding in gelatin of a green tree-shaped core in the central cavity 9 simultaneously with the molding around it in the cavity 10 of another colored gelatin, as for example, red, such colors being generally preferred around Christmas time. The outer mold 7 providing the outer cavity 10 is shown as circular, but the invention is not to be considered as limited to that shape. The bottom portion 11 of the outer mold 7 has a depressed central portion 12 which is of circular form and concentric with the side wall 13 of said mold and includes an annular groove 14 in which an annular downwardly projecting rim 15 provided on the bottom wall 16 of the inner mold 8 is adapted to be engaged to center the inner mold accurately with respect to the outer mold, while the marginally projecting portion 17 of said bottom wall fills the depression 12 flush with the inside of the outer mold, as indicated at 18, to define at least a portion of the bottom of said outer mold cavity and help to eject the outer portion of the molded gelatin from the outer mold in the first stage of the stripping operation.

In operation, the molds 6 will usually be sold with more than just one insert 8, as shown for example in FIGS. 3, 4 and 5, wherein 8a provides a heart-shaped cavity 9a, as shown in FIG. 3, while 8b in FIG. 4 provides a three-leafed clover or shamrock shaped cavity 9b, and in FIG. 5 8c provides a bell-shaped cavity 9c. In each of these inserts, the bottom wall, as for example 16a in FIG. 3, provides the marginally projecting portion 17a on which there is the downwardly projecting rim 15 of the same diameter as the rim 15 in FIGS. 1 and 2 adapted to fit in the annular groove 14 provided in the bottom of the outer mold 7. In all cases, the mix of one color is poured in the central cavity and the mix of another color in the outer cavity, and the mold is placed in the refrigerator for the gelatin to solidify and be kept until ready to serve, whereupon the mold is inverted and the gelatin drops out onto the plate, the outer mold 7 being stripped off first and then the inner mold 8 or 8a, 8b or 8c, as the case may be. The tapered form of the side walls 19 on the inner mold helps to strip it from the molded gelatin and the inner and outer portions of the molded gelatin will then come into abutment with one another, inasmuch as these side walls 19 are relatively thin and therefore do not create an appreciable void in the product molded.

The inner and outer mold elements are preferably molded of plastic material mainly for economy of production, but also for greater serviceability and durability and suitability for the present special purpose, polypropylene and polystyrene being considered especially suitable. These plastics have the advantageous property of not adhering noticeably to solidified gelatin molded therein.

It is believed the foregoing description conveys a good understanding of the objects and advantages of my invention. The appended claims have been drawn to cover all legitimate modifications and adaptations.

I claim:

1. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, the bottom wall of the outer mold element having a circular depression, and the bottom wall of the inner mold element being circular and fitting in and filling said depression, permitting assembling of the mold elements in any position of rotation relative to one another.

2. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, the bottom wall of the outer mold element having a circular depression, and the bottom wall of the inner mold element being circular and fitting in and filling said depression, permitting assembling of the mold elements in any position of rotation relative to one another, the outer mold element having a depending circular supporting rim on the bottom wall thereof, and the inner mold element having a depending circular flange on the bottom wall thereof fitting in a circular groove provided in said rim.

3. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, there being one or more other inner mold elements adapted to be assembled in the outer mold element interchangeably in place of the first mentioned inner mold element, the side walls of the plurality of inner mold elements being differently patterned for differently shaped molded food masses, the bottom walls of said inner mold elements being all substantially alike for the same interfitting relationship to the bottom wall of the outer mold element.

4. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, there being one or more other inner mold elements adapted to be assembled in the outer mold element interchangeably in place of the first mentioned inner mold element, the side walls of the plurality of inner mold elements being differently patterned for differently shaped molded food masses, the bottom walls of said inner mold elements being all substantially alike for the same interfitting relationship to the bottom wall of the outer mold element, the depression in the bottom wall of the outer mold element being circular, and the bottom walls of the inner mold elements being also circular to fit in and fill the depression interchangeably in any position of rotation of one of said interfitting mold elements relative to the other.

5. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, there being one or more other inner mold elements adapted to be assembled in the outer mold element interchangeably in place of the first mentioned inner mold element, the side walls of the plurality of inner mold elements being differently patterned for differently shaped molded food masses, the bottom walls of said inner mold elements being all substantially alike for the same interfitting relationship to the bottom wall of the outer mold element, the depression in the bottom wall of the outer mold element being circular, and the bottom walls of the inner mold elements being also circular to fit in and fill the depression interchangeably in any position of rotation of one of said interfitting mold elements relative to the other, the outer mold element having a depending circular supporting rim on the bottom wall thereof, and each of the inner mold elements having a depending circular flange on the bottom wall thereof fitting in a circular groove provided in said rim.

6. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, there being one or more other inner mold elements adapted to be assembled in the outer mold element interchangeably in place of the first mentioned inner mold element, the side walls of the plurality of inner mold elements being differently patterned for differently shaped molded food masses, the bottom walls of said inner mold elements being all substantially alike for the same interfitting relationship to the bottom wall of the outer mold element, the depression in the bottom wall of the outer mold element being circular, and the bottom walls of the inner mold elements being also circular to fit in and fill the depression interchangeably in any position of rotation of one of said interfitting mold elements relative to the other, the side walls on the inner mold elements being all substantially vertical and tapered upwardly from the bottom walls to facilitate stripping of said inner mold elements from the molded food mass.

7. A food molding structure comprising an outer larger main mold element, and an inner smaller auxiliary mold element, each of the two mold elements having side walls and said mold elements having detachably interfitting bottom walls, whereby the side walls of said elements are held disposed in a predetermined radially spaced relationship to one another during filling and for a period of time thereafter, the cavities defined in the two mold elements being separately fillable and being separated by the side walls of the inner mold element, there being one or more other inner mold elements adapted to be assembled in the outer mold element interchangeably in place of the first mentioned inner mold element, the side walls of the plurality of inner mold elements being differently patterned for differently shaped molded food masses, the bottom walls of said inner mold elements being all substantially alike for the same interfitting relationship to the bottom wall of the outer mold element, the outer mold element and all of the inner mold elements being molded of a plastic material having the property of not adhering noticeably to solidified gelatin when molded therein.

References Cited in the file of this patent

UNITED STATES PATENTS

| | | |
|---|---|---|
| 1,183,731 | Hopkins | May 16, 1916 |
| 2,028,671 | Kollman | Jan. 21, 1936 |
| 2,136,361 | Eklund | Nov. 15, 1938 |
| 2,946,207 | Hulterstrum | July 26, 1960 |